(12) United States Patent
Sodagar

(10) Patent No.: US 12,058,414 B2
(45) Date of Patent: Aug. 6, 2024

(54) METHODS, DEVICES, AND COMPUTER READABLE MEDIUM FOR PROCESSING ALTERNATIVE MEDIA PRESENTATION DESCRIPTION

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/135,250

(22) Filed: Apr. 17, 2023

(65) Prior Publication Data

US 2023/0336821 A1    Oct. 19, 2023

Related U.S. Application Data

(60) Provisional application No. 63/332,590, filed on Apr. 19, 2022.

(51) Int. Cl.
*H04N 21/462* (2011.01)
*H04N 21/435* (2011.01)

(52) U.S. Cl.
CPC ......... *H04N 21/462* (2013.01); *H04N 21/435* (2013.01)

(58) Field of Classification Search
CPC ............... H04N 21/462; H04N 21/435; H04N 21/23424; H04N 21/26258; H04N 21/44016; H04N 21/812; H04N 21/8455; H04N 21/8456
See application file for complete search history.

(56) References Cited

U.S. PATENT DOCUMENTS

| 9,344,472 B2 | 5/2016 | Cheng et al. |
| 2014/0195651 A1 | 7/2014 | Stockhammer et al. |
| 2016/0316247 A1 | 10/2016 | Biagini et al. |
| 2016/0032606 A1* | 11/2016 | Mao ................... H04N 21/2381 |

(Continued)

OTHER PUBLICATIONS

Notification of Transmittal of International Search Report and Written Opinion and International Search Report and Written Opinion regarding PCT/US 23/65870 dated Aug. 4, 2023.

(Continued)

*Primary Examiner* — Anthony Bantamoi
(74) *Attorney, Agent, or Firm* — Crowell & Moring LLP

(57) ABSTRACT

This disclosure generally relates to media streaming technologies and more specifically to methods and apparatuses for processing an alternative media presentation description (MPD) with a main MPD from a content server. The method comprises receiving a manifest for the alternative MPD from the content server by a dynamic adaptive streaming over HTTP (DASH) media streaming device; parsing the manifest to extract a set of parameters for the alternative MPD, the set of parameters comprising at least one of a value for a DASH event stream, a presentation time, or a duration; switching from a main media presentation to an alternative media presentation based on the presentation time; and in response to ending the alternative media presentation, playing back the main media presentation at a return point according to the value for the DASH event stream.

20 Claims, 6 Drawing Sheets

400 receiving a manifest for the alternative MPD from the content server by the DASH media streaming device;
410 parsing the manifest to extract a set of parameters for the alternative MPD, the set of parameters comprising at least one of a value for a DASH event stream, a presentation time, or a duration, wherein the presentation time indicates an offset in which an alternative media presentation starts in a timeline of a main media presentation, and the duration indicates a period in which the alternative media presentation is active;
420 switching from a main media presentation to an alternative media presentation based on the presentation time;
430 in response to ending the alternative media presentation, playing back the main media presentation at a return point according to the value for the DASH event stream
440

(56) References Cited

U.S. PATENT DOCUMENTS

2017/0171610 A1    6/2017  Nair et al.
2017/0195718 A1    7/2017  Nair et al.

OTHER PUBLICATIONS

"Information technology—Dynamic adaptive streaming over HTTP (DASH)—Part 1 : Media presentation description and segment formats," FDIS Stage, Vernier, Geneva, Switzerland, $5^{th}$ Edition, ISO/IEC 23009-1 :2021 (X), ISO/IEC JTC 1/SC 29/WG 3, 2021.
"Text of ISO/IEC 23009-1 4th edition DAM 2 PrePeriod, nonlinear playback and other extensions," WG 03 N0459, Source ISO/IEC JTC 1/SC 29/WG 03, dated Feb. 5, 2022, 44 pages.

\* cited by examiner

METHODS, DEVICES, AND COMPUTER READABLE MEDIUM FOR PROCESSING ALTERNATIVE MEDIA PRESENTATION DESCRIPTION

INCORPORATION BY REFERENCE

This application is based on and claims the benefit of priority to U.S. Provisional Application No. 63/332,590 filed on Apr. 19, 2022, which is herein incorporated by reference in its entirety.

TECHNICAL FIELD

This disclosure generally relates to media streaming technologies and more specifically to methods and apparatuses for processing alternative media presentation description (MPD) in adaptive streaming.

BACKGROUND

This background description provided herein is for the purpose of generally presenting the context of the disclosure. Work of the presently named inventor(s), to the extent the work is described in this background section, as well as aspects of the description that may not otherwise qualify as prior art at the effective time of filing of this application, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. In the DASH standard, a media presentation description (MPD) is used to provide information for a DASH client to adaptively stream media content by downloading media segments from a DASH server. The DASH standard allows the streaming of multi-rate content. One aspect of the DASH standard includes carriage of MPD events and inband events, and a client processing model for these handling these events.

Common Media Application Format (CMAF) is a standard for packaging and delivering various forms of Hypertext transfer protocol (HTTP) based media. This standard simplifies the delivery of media to playback devices by working with, for example, the HTTP Live Streaming (HLS), and DASH protocols to package data under a uniform transport container file. It also employs chunked encoding and chunked transfer encoding to lower latency.

MPEG DASH may provide some means for streaming multimedia content over IP networks with alternative MPD events for signaling the media presentation between two timelines. There are various issues/problems with how to process alternative MPD events.

The present disclosure describes various embodiments for processing alternative MPD events, addressing at least one of the issues/problems, advancing the technical field of media streaming.

SUMMARY

This disclosure generally relates to media streaming technologies and more specifically to methods and apparatuses for processing alternative MPD events in dynamic adaptive streaming. The alternative MPD events may be sent by a media content server to a media streaming client and then are processed by a media streaming client.

According to one aspect, an embodiment of the present disclosure provides a method by a media streaming device for processing an alternative media presentation description (MPD) with a main MPD from a content server. The method comprises receiving a manifest for the alternative MPD from the content server by the media streaming device; parsing the manifest to extract a set of parameters for the alternative MPD, the set of parameters comprising at least one of a value for an event stream, a presentation time, or a duration, wherein the presentation time indicates an offset in which an alternative media presentation starts in a timeline of a main media presentation, and the duration indicates a period in which the alternative media presentation is active; switching from a main media presentation to an alternative media presentation based on the presentation time; and in response to ending the alternative media presentation, playing back the main media presentation at a return point according to the value for the event stream. The media streaming device comprises a dynamic adaptive streaming over HTTP (DASH) media streaming device; and the event stream comprises a DASH event stream.

According to another aspect, an embodiment of the present disclosure provides a method by a media streaming content server for configuring an alternative media presentation description (MPD) with a main MPD and sending the alternative MPD to a media streaming device. The configured MPD is configured to cause the media streaming device to carry out any one of the method implementations described in the present disclosure. The media streaming device comprises a dynamic adaptive streaming over HTTP (DASH) media streaming device.

Aspects of the disclosure also provide a media streaming device or apparatus including a circuitry configured to carry out any one of the method implementations above.

Aspects of the disclosure also provide non-transitory computer-readable mediums storing instructions which when executed by a media streaming device are configure to cause the media streaming device to perform any one of the method implementations above.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Streaming Over Hypertext Transfer Protocol (HTTP)

Figure 1:
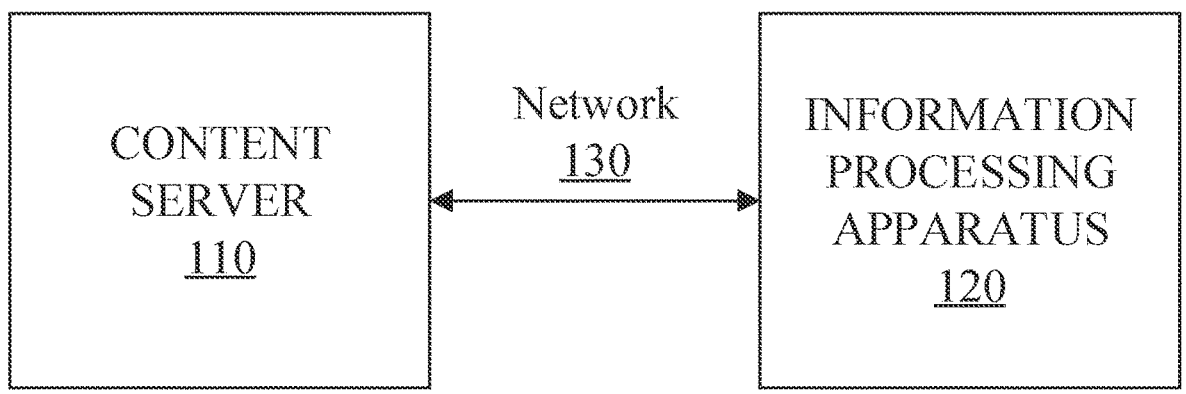
FIG. 1 illustrates a system according to an embodiment of the present disclosure.

FIG. 1 illustrates an example content distribution system 100, in which a remote information processing apparatus 120 is configured to request contents from one or more centralized or distributed content servers 110 over a communication network 130. In particular, the information processing apparatus 120 may include dedicated hardware components, software components running on general purpose hardware, or the combination thereof, which functions as a content consuming application. The content consuming application may generate one or more requests specifying the contents being requested and the characteristics of the requested contents. Each request may be constructed based on a stack of network protocols, and communicated to the content server 110 over the communication network 130. In response, the content server may generate a bitstream according to the request, package the bitstream using the stack of network protocols and communicate the bitstream packages to the content consuming application.

In some example implementations, the content may be requested at once. In other words, an entirety of a media content may be requested by the content consuming application, received, and stored locally. The locally stored content may be processed and consumed as needed (e.g., extracted, decoded, and played back) by, for example a media player, either being part of or separate from the content consuming application. Such a process may be referred to as downloading.

In some other implementations, the content may be streamed as it is being consumed rather than being downloaded for later consumption. In such implementations, the entirety of the requested content may not need to be stored in the content consuming application. Rather, only a limited amount of content is continuously received from the content server 110 on a rolling basis and managed by an in-and-out local buffer for content processing and playback. Such implementations may be referred to as streaming. While some media playback functions, such as rewinding, fast-forwarding, and seeking may involve complex media bitstream control and buffering, media streaming is usually more versatile and more suitable for distribution of contents containing timed sequences of media that are not repeated consumed.

In the disclosure below, the terms "content" and "media" may be used interchangeably. A requested content may include various information items needed for its consumption, including but not limited to the content itself and various metadata. The content itself, may further include various media components, such as different tracks, including but not limited to video components/tracks, audio components/tracks, subtitles, and the like. Metadata for describing the media content or providing additional processing information may be treated as one or more separate tracks. Such content with its metadata may be generated by the content server 120 as a bitstream that can be parsed and decoded according to a set of protocols or rules known to the content consuming application. The term "content server" in its singular form is used to represent a single server or a plurality of servers arranged in a central location or distributed over various geographical locations. Such content servers may be implemented as dedicated computing machines, or alternatively, may be constructed as virtual machines, and/or as virtually hosed in a cloud computing environment. Further in the disclosure below, the terms "information processing apparatus" (referring to 120 of FIG. 1) and "content consuming application" may be used interchangeably. These terms may also be alternatively referred to as "client," "client devices/apparatus," "playback devices/apparatus/client," and the like. While only a single information processing apparatus 120 is shown in FIG. 1, there can be a plurality of independent information processing apparatus. In other words, a set of content servers 110 may be configured to simultaneously and independently provide streaming service to a plurality of content consuming applications.

In some example implementations, contents generated for distribution by the content server 110 may be segmented to facilitate their streaming. For example, timed sequences of media contents such as movies, may be chopped into time segments, each containing a number of media frames. Each media segment may be self-contained such that its processing including, for example, parsing, decoding, and playback, does not require information for other media segments. The media contents may be pre-segmented. Accordingly, the media contents may be stored and managed by the content server 120 segment by segment. Alternatively, media segments may be generated in real-time from contiguously stored media contents as they are being requested during streaming processes. In some further implementations, the segmentation of the media may be hierarchical, containing multiple levels of segmentation.

In some particular implementations for streaming, decision as to which media segments or which portions of the media segments to request from the content server 110 may be determined by a content consuming application in real time as controlled by user play-back instructions through a user application interface. In such a manner, the content server may be configured to respond to the requests and generate or retrieve segments or portions of segments of the content with their metadata according to the requests, and deliver the segments or portions of the segments to the requesting content consuming application over the network 130.

In some example implementations, a same media track of a media content may be prepared as different versions. For example, the same movie track may be prepared in different resolutions and/or frame rate. For another example, the same movie track may be prepared in different bitrates. For another example, the same audio movie may be prepared with different sound quality and/or different number of sound channels (e.g., 5-channel sound, or 7-channel sound). Accordingly, the content consuming application may determine which version of the media tracks to stream and include such selection in its requests for media content. Such decision by the content consuming application, may be made based on one or more of a number of example factors, including but not limited to the playback capabilities of the information processing apparatus 120 (e.g., display resolution, decoding speed, processing power, buffer size, and the like), the network bandwidth and throughput, and the like. As such, the streaming session may be adapted among different media consuming applications according to their device capabilities. A streaming architecture so configured may be referred to as adaptive streaming. The streaming process may further be adaptive within each media consuming application in that different versions of the media tracks may be selected and requested at different times during a streaming session, according to, for example, a real-time network condition (for example, bandwidth and throughput, and bitrate supported by the network bandwidth). A streaming architecture so configured may be further referred to as dynamic adaptive streaming. In particular, a streaming architecture configured to adapt to bitrates of the media content may be referred to as dynamic adaptive bitrate streaming.

In some example implementations, a request for a particular version of segments or portions of segments of media content by the content consuming application in dynamic adaptive streaming may be constructed based on a media manifest according to the progression of the streaming session. The term "manifest" may be used to represent any collection of information items that describe the media content, including the segmentation, versions, network locations, and any other information that may be needed for any content consuming application to determine how and what to request at different times during a streaming session. A manifest may be generally referred to as a "media presentation description" (MPD).

Such a manifest may be prepared on the content server side at the time when a particular media content is created or generated. Such a manifest may be requested by the content consuming application and received from the content server at the beginning of a streaming session. The content consuming application may further request any update of the manifest during the streaming session. Such manifest may be used by the content consuming device as a blueprint for constructing the subsequent requests of particular version of segments or portions of segments of the media content during the streaming session.

In some example implementations, the media server may be configured to function similarly to a web server from the stand points of external applications. As such, a request for a media manifest and/or for media segments or portions of media segments by a content consuming application may be made based on, for example, the hypertext transfer protocol (HTTP). As such, a request may be constructed as a URL and the requested content may be delivered as a response to the HTTP request from the content server.

Details for the manners in which the manifests are specified, the contents are segmented, organized, and versioned, and the HTTP requests are constructed may depend on specific adaptive streaming protocol, such as Dynamic Adaptive Streaming over HTTP (DASH), HTTP Live Streaming (HLS), Smooth Streaming Transport Protocol (SSTP), and the like. The various additional example implementations below may be described in the context of DASH. However, the underlying principles are applicable to any type of adaptive streaming over HTTP. Further, the underlying principles are applicable to media content request mechanism based on network protocols other than HTTP.

Dynamic Adaptive Streaming Over HTTP (DASH)

One example protocol for implementing adaptive media streaming includes Dynamic Adaptive Streaming over Hypertext transfer protocol (DASH). As described above, DASH represents one of the adaptive bitrate streaming implementations that enables streaming of media content using content delivery networks (CDNs) based on hypertext transfer protocol (HTTP) infrastructures, including content servers configured as web servers with various proxies and caches, and the like. Such content servers may be referred to as DASH servers. The content consuming applications described above may accordingly be referred to as DASH clients.

DASH supports live streaming from a DASH server to a DASH client, and allows the DASH client to control a streaming session, so that the DASH server does not need to cope with an additional load of stream adaptation management in large scale deployments. As described above, DASH also allows the DASH client a choice of streaming from various DASH servers, thereby achieving further load-balancing of the network for the benefit of the DASH client. DASH further provides dynamic switching between different media versions of the media tracks, for example, by varying bitrates to adapt to network conditions and processing capability of a DASH client.

In DASH, the media manifest described above may be particularly referred to as an MPD (even though the term MPD may be generally used to refer to manifest of any type in adaptive streaming systems other than the ones based on DASH). For example, an MPD in DASH may be constructed as a file that is downloadable in full or in part by a DASH client and that provides information items used by the DASH client to stream the media content by selectively and adaptively requesting streaming media segments from the DASH server.

An MPD may be constructed in various formats. For example, an MPD may be constructed in the form of an Extensible Markup Language (XML) document or file. The MPD file may be requested and delivered to the DASH client. The MPD file may be requested by HTTP via, for example, an HTTP GET request. The MPD file may be delivered entirely at the beginning of a streaming session.

Alternatively, the MPD file can be fragmented and delivered in parts. As such, parts of the MPD file may be requested and delivered prior to the start of the streaming and other parts of the MPD file may be requested and delivered later to reduce session start-up delay (such that the streaming can begin with the earlier media segments without having to wait for information items pertaining to later segments of the media). The MPD file can also be updated during the streaming session (e.g., with the segment information that is needed but is not yet retrieved).

In some example implementations, the MPD file describes the segmentation of the media content, the organization of the segments, and available versions of the segments. The MPD may support expression of content accessibility features, ratings, camera views, metadata, and the like. DASH may also support delivery of multi-view and scalable coded content.

In some example implementations, an MPD file may contain a sequence of descriptions for one or more periods along a media consumption timeline (e.g., play time of a video content). Each of the one or more periods may be defined by, for example, a "period" information element tag in the MPD file. The media content may be indicated by the MPD file as organized in a plurality of continuous periods in time. The MPD file may identify a start time for each of the periods in the playback timeline. The start time may be defined as an absolute start time from a beginning of the media content or as a relative offset from other reference point in the playback timeline.

In some example implementations, for each media period, the MPD file may further specify one or more adaptations sets. Different adaptation sets may be specified to capture different combinations (or subset) of one or more of the media components. For example, video and audio can be different adaptation sets. Different versions of audios (stereo audio or multi-channel audio) may be different adaptation set. Audio of different language may be different adaptation sets. In one particular example, the MPD file may specify that each period contains one video adaptation set, multiple audio adaptation sets, one for each of the supported languages. Adaptation sets may also contain subtitles or arbitrary metadata.

In some example implementations, adaptation sets of a particular period may be assigned to a group indicated by a group attribute in the MPD file. Adaptation sets in the same group are generally considered alternatives to each other. For example, each adaptation set of video data for a particular period can be assigned to the same group, such that any adaptation set can be selected for video data of the multimedia content for the corresponding period. The media content within one period can be from either one adaptation set, or a combination of adaptation sets, with each group contributing at most one adaptation set.

In some example implementations, each adaptation set may be specified by the MPD file as containing one or more representations for the same media component for the corresponding period. A representation, for example, can be one of a number of alternative encoded versions of audio or video data. The representations can differ by encoding types, e.g., by bitrate, resolution, and/or codec for video data, and bitrate, and/or codec for audio data. The term representation can be used to refer to a section of encoded media data corresponding to a particular period of the multimedia content and encoded in a particular way to achieve a certain range of average bitrate. In some examples implementations, for each representation in an adaptation set, the MPD file may specify attributes of the representation including but not limited to video/audio type, video/audio codecs, video frame width in pixels, video frame height in pixels, video/audio frame rate, and bandwidth (representing average encoded bitrate).

Each representation of an adaptation set may also include one or more media components depending the combination of media components included in the adaptation set. Each media component in a representation may correspond to an encoded version of one individual media type, such as audio, video, or timed text (e.g., for closed captioning). Media components can be time-continuous across boundaries of consecutive media segments within one representation.

In some example implementations, a representation may include one or more segments. Each representation can include an initialization segment, or each segment of a representation can be self-initializing. When present, the initialization segment can contain initialization information for accessing the representation. In some cases, the initialization segment does not contain media data. Segments that contain media data may represent the time-segmented contents. Segments between different representations may be aligned in time. For each media segment, the MPD file may include a unique identifier. Such an identifier, when combined with a basis URL, a base URN, or base uniform resource identifier (URI), may form a unique URL, URN or URI that represents a network location of the media segment, which may be included in an HTTP request for this media segment and be used by the content server to locate the requested segment for delivery.

For example, a URL for requesting a media segment can be defined as an <absolute-URI>, with a fixed scheme of "http" or "https", possibly further supplemented by a byte range if a range attribute is provided together with the URL. The byte range can be expressed to identifying a contiguous range of bytes in the segment.

In some further example implementations, sub-representations may be specified and described in the MPD file as being embedded (or contained) in regular representations using, for example, a Sub-Representation element/indicator. The sub-representation element may be used to describe properties of one or several media content components that are embedded in the representation. For example, the sub-representation element may be used to describe properties of an embedded audio component (e.g., codec, sampling rate, etc.), an embedded sub-title (e.g., codec), or the sub-representation element may be used to describe some embedded lower quality video layer (e.g., some lower frame rate, etc.). Sub-representation and representation elements can share some common attributes and elements.

In some example implementations, the DASH client may be configured to access, download, and request an entirety or a portion of the MPD file from the DASH server. That is, the DASH client may retrieve the MPD file for use in initiating a live streaming session. Based on the MPD file, and selection of a representation, the DASH client can make several further decisions, including determining what is the latest segment that is available on the server, determining the segment availability start time of the next segment and possibly future segments, determining when to start playback of the segment, and determining when to get/fetch/request a new MPD file.

In some example implementations, the MPD may further include information about DASH events in order to signal aperiodic information to DASH clients or DASH applications. Events may be timed, starting at a specific media presentation time with a duration. Additionally or alternatively, the event information may include control messages for a media player that are associated with specific times during playback of the media presentation, such as advertisement insertion cues. Media that may be inserted during streaming may be provided from separate servers, such as an advertisement server. In addition to signaling the events by MPD separately from the media representations, events may also be multiplexed in-band in a selected media representation in one or several selected adaptation sets only, or in all representations.

Figure 2:
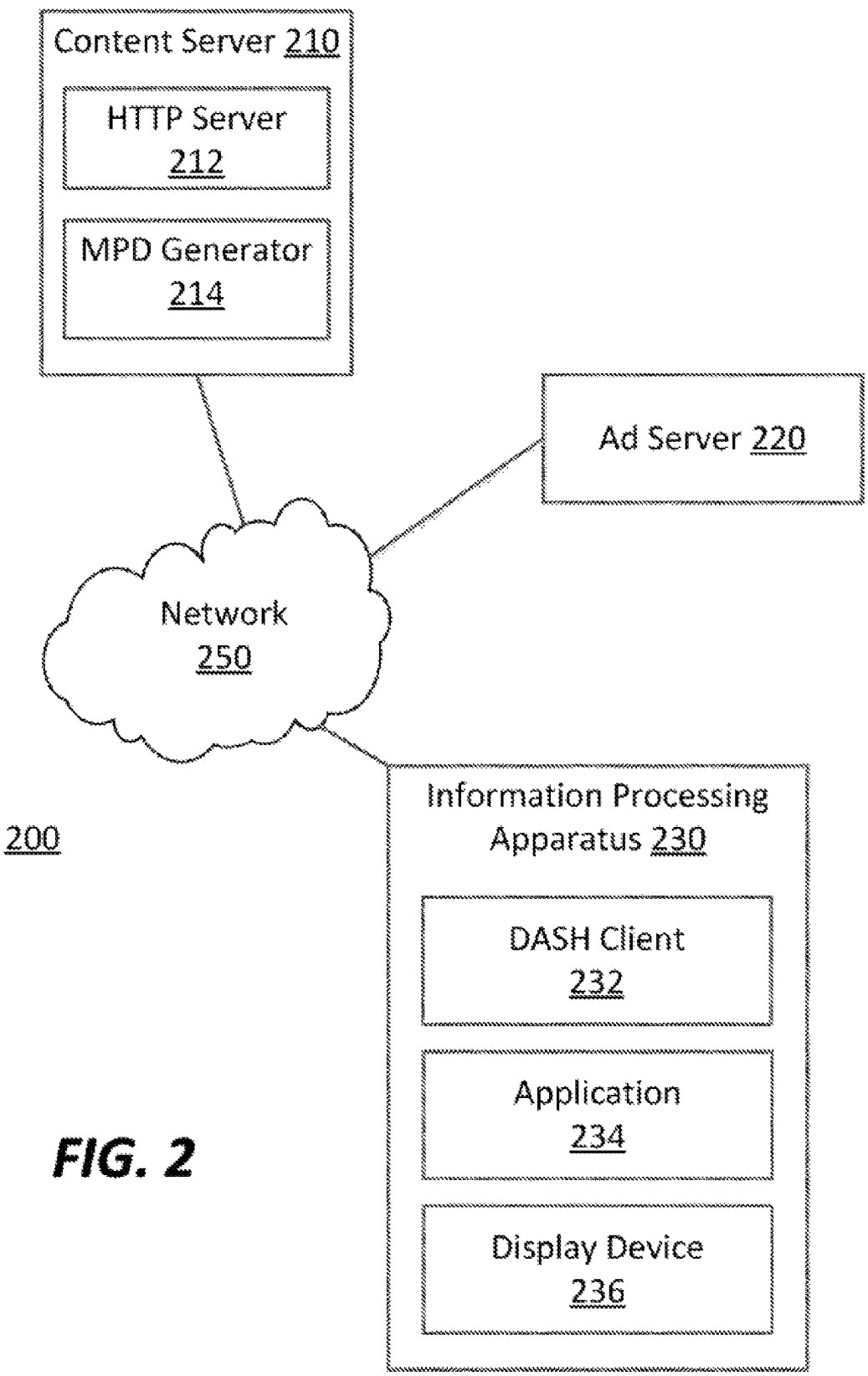
FIG. 2 illustrates a Dynamic Adaptive Streaming over HTTP (DASH) system according to an embodiment of the present disclosure.

An exemplary DASH system 200 is illustrated in FIG. 2. The DASH system 200 may include one or more centralized or distributed content servers 210 and an information processing apparatus 230 which are connected by a network 250. The DASH system (200) may also include one or more supplemental content servers such as one or more advertisement server 220.

The content server 210 may provide primary content (e.g., a main program) and an MPD for the content, to the information processing apparatus 230. The manifest file can be generated by an MPD generator 214. The primary content and the manifest file can be provided by a same sever or different servers.

The information processing apparatus 230 may include a DASH client 232 that directly communicate with the content server 210. The DASH client 232, controlled by a DASH application 234 of the information processing apparatus 230, may request and/or receive the MPD and may request and acquire primary content from an HTTP server 212 of the content server 210 based on the MPD. The MPD may be processed by the DASH client 232. Further, the DASH client 232 may acquire advertisement content from the advertisement server 220, or other content (e.g., interactive content) from one or more supplemental content servers according to DASH events. The main content and the advertisement content can be processed by the DASH client 232 and the DASH application 234 and output for display on a display device 236 of the information processing apparatus 230. The display device 236 may be integrated with, or external to, the information processing apparatus 230. Further, the DASH client 232 may extract other event information from one or more timed metadata tracks and send the extracted event information to the DASH application 234 for further processing. The DASH application 234 may be configured, for example, to display supplemental content based on the event information.

Figure 3A:
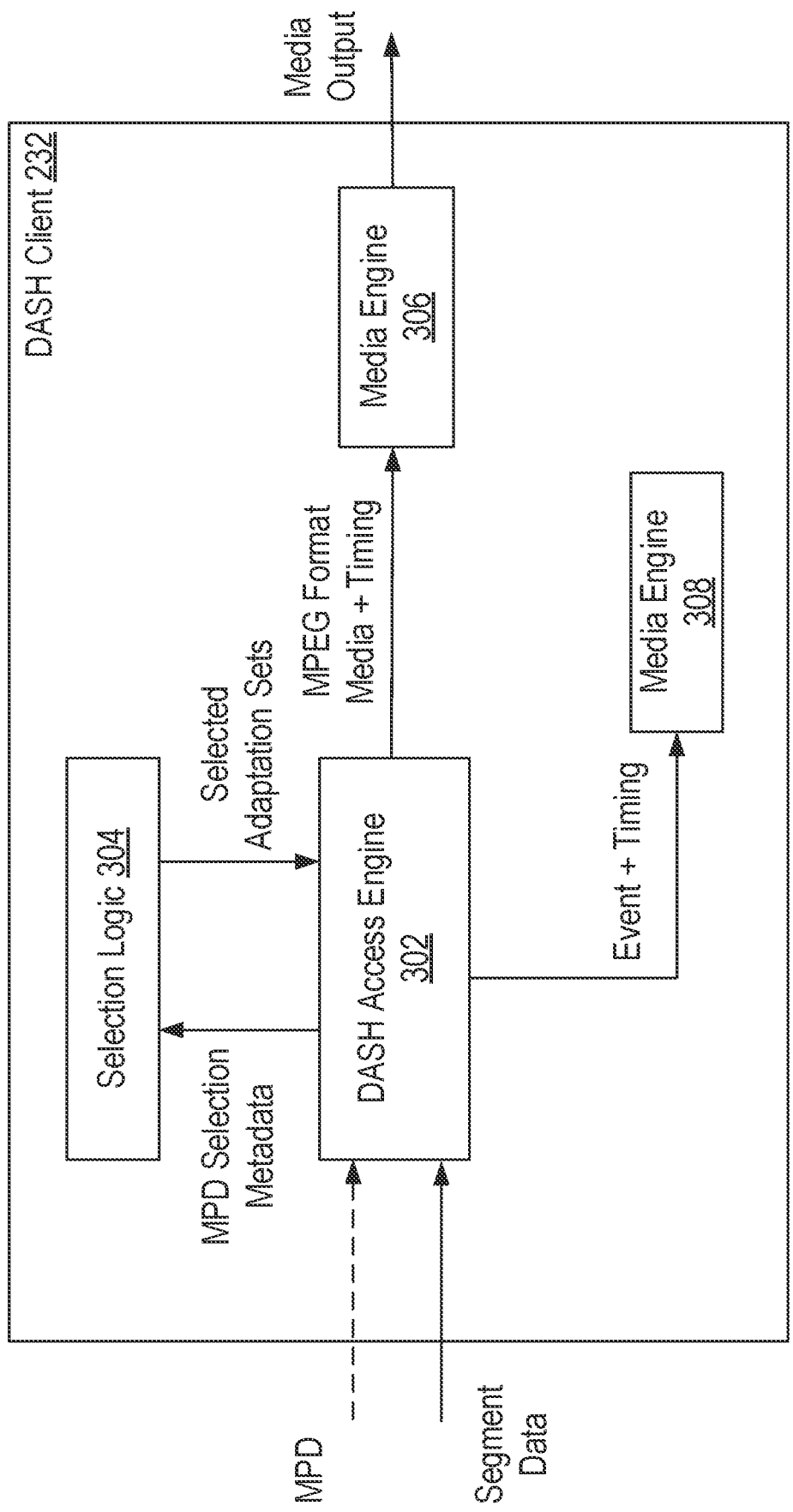
FIG. 3A illustrates a DASH client architecture according to an embodiment of the present disclosure.

An example for the DASH client 232 is illustrated in FIG. 3A. The example DASH client 232 may include a DASH access engine 304, a selection logic 302, and media engines 306 and 308. The DASH access engine 302, for example, may be configured to communicate with the content server for retrieving a portion of or an entirety of the MPD of the streaming media, and for requesting and retrieving segment data of the dynamically requested streaming media as well as for requesting supplemental media (advertisement) according to MPD DASH events. The selection logic 304 may be configured to determine the next one or more segments to request including selection of adaptation sets and representations. Such decision for example, may be determined by user instructions as well as by other real time information such as the network bandwidth and throughput. The media engines 306 may be configured to process the segment data received by the DASH access engine 302 according to a format of the media segments (e.g., MPEG) and timing of the media segments to generate main media output. The media engine 308 may be configured to process media content associated with timed DASH events from the DASH Access Engine 302 to generate supplemental media output (such as advertisement), which, for example, may be inserted into the main media output.

Figure 3B:
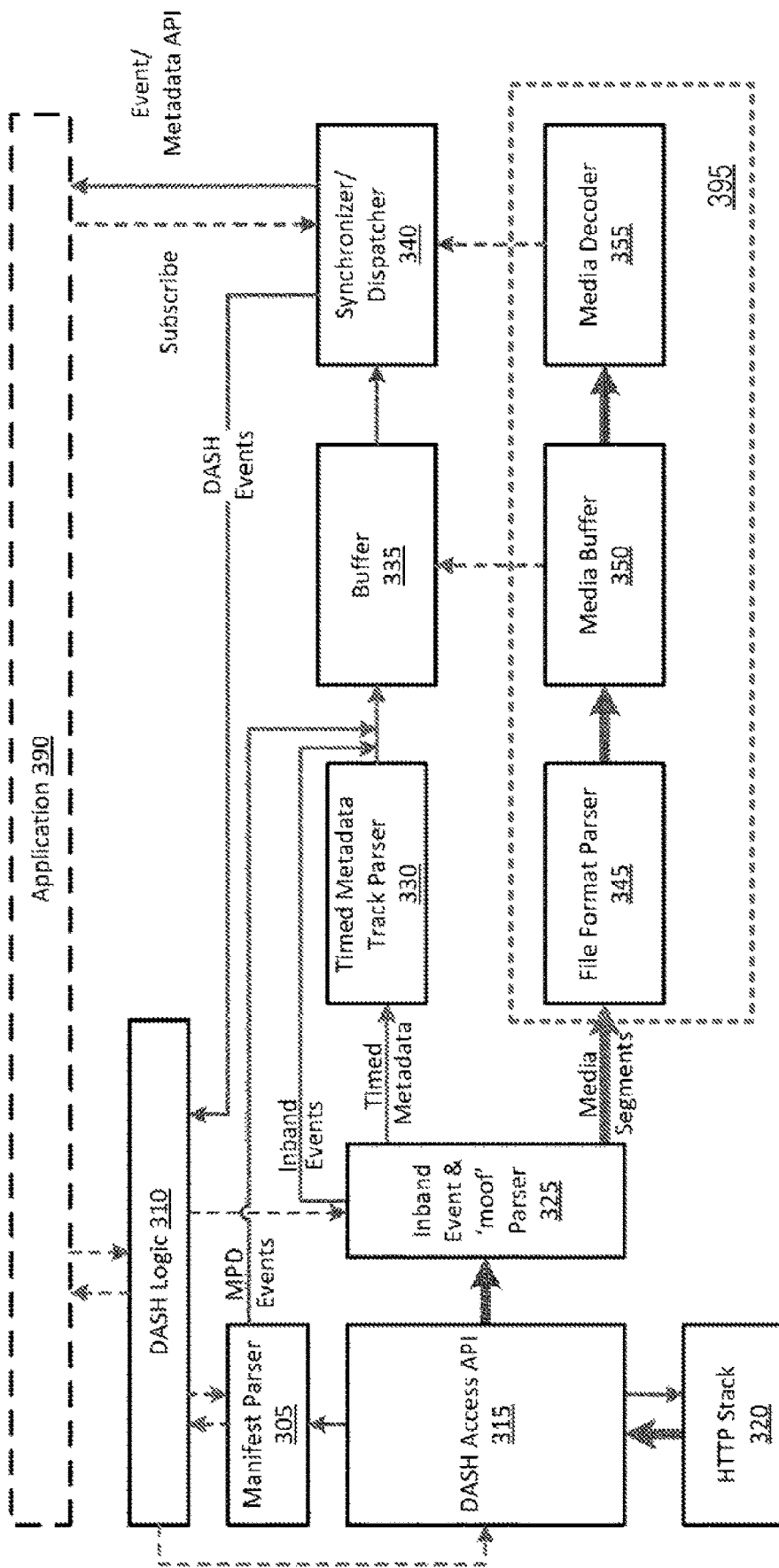
FIG. 3B illustrates another DASH client architecture according to an embodiment of the present disclosure.

FIG. 3B illustrates another example DASH/CMAF client architecture for processing DASH and/or CMAF events according to an embodiment of the present disclosure. The DASH/CMAF client (or DASH/CMAF player) can be configured to communicate with an application (390) and process various types of events, including (i) MPD events, (ii) inband events, and (iii) timed metadata events.

A manifest parser (305) parses a manifest (e.g., an MPD). The manifest is provided by the content server (110, 210), for example. The manifest parser (305) extracts event information about MPD events, inband events, and timed metadata events embedded in timed metadata tracks. The extracted event information can be provided to DASH logic (310) (e.g., DASH player control, selection, and heuristic logic). The DASH logic (310) can notify an application (390) of event schemes signaled in the manifest based on the event information.

The event information can include event scheme information for distinguishing between different event streams. The application (390) can use the event scheme information to subscribe to event schemes of interest. The application (390) can further indicate a desired dispatch mode for each of the subscribed schemes through one or more subscription APIs. For example, the application (390) can send a subscription request to the DASH client that identifies one or more event schemes of interest and any desired corresponding dispatch modes.

If the application (390) subscribes to one or more event schemes that are delivered as part of one or more timed metadata tracks, an inband event and 'moof' parser (325) can stream the one or more timed metadata tracks to a timed metadata track parser (330). For example, the inband event and 'moof' parser (325) parses a movie fragment box ("moof") and subsequently parses the timed metadata track based on control information from the DASH logic (310).

The timed metadata track parser (330) can extract event messages embedded in the timed metadata track. The extracted event messages can be stored in an event buffer (335) (e.g., an event buffer). A synchronizer/dispatcher module (340) (e.g., event and timed metadata synchronizer and dispatcher) can dispatch (or send) the subscribed events to the application (390).

MPD events described in the MPD can be parsed by the manifest parser (305) and stored in the buffer (335). For example, the manifest parser (305) parses each event stream element of the MPD, and parses each event described in each event stream element. For each event signaled in the MPD, event information such as presentation time and event duration can be stored in the buffer (335) in association with the event.

The inband event and 'moof' parser (325) can parse media segments to extract inband event messages. Any such identified inband events and associated presentation times and durations can be stored in the buffer (335).

Accordingly, the buffer (335) can store therein MPD events, inband events, and/or timed metadata events. The buffer (335) can be a First-In-First-Out (FIFO) buffer, for example. The buffer (335) can be managed in correspondence with a media buffer (350). For example, as long as a media segment exists in the media buffer (350), any events or timed metadata corresponding to that media segment can be stored in the buffer (335).

A DASH Access Application Programming Interface (API) (315) can manage the fetching and reception of a content stream (or dataflow) including media content and various metadata through an HTTP protocol stack (320). The DASH Access API (315) can separate the received content stream into different dataflows. The dataflow provided to the inband event and moof parser can include media segments, one or more timed metadata tracks, and inband event signaling included in the media segments. In an embodiment, the dataflow provided to the manifest parser 305 can include an MPD.

The DASH Access API (315) can forward the manifest to the manifest parser (305). Beyond describing events, the manifest can also provide information on media segments to the DASH logic (310), which can communicate with the application (390) and the inband event and moof parser (325). The application (390) can be associated with the media content processed by the DASH client. Control/synchronization signals exchanged among the application (390), the DASH logic (310), the manifest parser (305), and the DASH Access API (315) can control the fetching of media segments from the HTTP Stack (320) based on information regarding media segments provided in the manifest.

The inband event and moof parser (325) can parse a media dataflow into media segments including media content, timed metadata in a timed metadata track, and any signaled inband events in the media segments. The media segments including media content can be parsed by a file format parser (345) and stored in the media buffer (350).

The events stored in the buffer (335) can allow the synchronizer/dispatcher (340) to communicate to the application the available events (or events of interest) related to the application through an event/metadata API. The application can be configured to process the available events (e.g., MPD events, inband events, or timed metadata events) and subscribe to particular events or timed metadata by notifying the synchronizer/dispatcher (340). Any events stored in the buffer (335) that are not related to the application, but are instead related to the DASH client itself can be forwarded by the synchronizer/dispatcher (340) to the DASH logic (310) for further processing.

In response to the application (390) subscribing to particular events, the synchronizer/dispatcher (340) can communicate to the application event instances (or timed metadata samples) corresponding to event schemes to which the application has subscribed. The event instances can be communicated in accordance with a dispatch mode indicated by the subscription request (e.g., for a specific event scheme) or a default dispatch mode. For example, in an on-receive dispatch mode, event instances may be sent to the application (390) upon receipt in the buffer (335). On the other hand, in an on-start dispatch mode, event instances may be sent to the application (390) at their associated presentation time, for example in synchronization with timing signals from the media decoder (355).

In some implementations, a media segment engine (MSE) (395) may include the file format parser (345), the media buffer (350), and the media decoder (355). The MSE may receive media segments and generate the decoded media output.

Configuring and Processing Alternative MPD

In some implementations allows the streaming of multi-rate content, and utilizes alternative MPD events for switching media presentations between two timelines: one timeline for a main MPD event for a main media presentation; and another timeline for an alternative MPD event for an alternative media presentation. There may be some issues/problems with how to provide a client post-processing model.

For example, some implementations with DASH design may include one or more of the following issues/problems: no return point for on-demand content; assumption of the switch time being the same as the event start time; and/or assumption of the advertisement (ad) duration being the same as the event duration.

Various embodiments describe a processing model for the DASH client to provide, dispatch, and post-process the alternative MPD events. Some implementations provide different signaling and improved post-processing models that correctly processes the alternative MPD events, for example, efficiently and effectively enabling preroll and/or midroll advertisements.

Various embodiments may also address one or more of the issues/problems described in the present disclosure. For example, some embodiments may improve the media streaming field by one or more of the following: adding the return point for on-demand content; separating these two parameters (switch time and event start time) to achieve preroll and midroll correctly; and/or separating these two parameters (advertisement duration and event duration) to achieve switching to and back from ad correctly.

Referring to FIG. 3B, a client may request the media segments based on the described addresses in the manifest. The MSE buffer may include a pipeline of the file format parser, the media buffer, and the media decoder.

Figure 4:
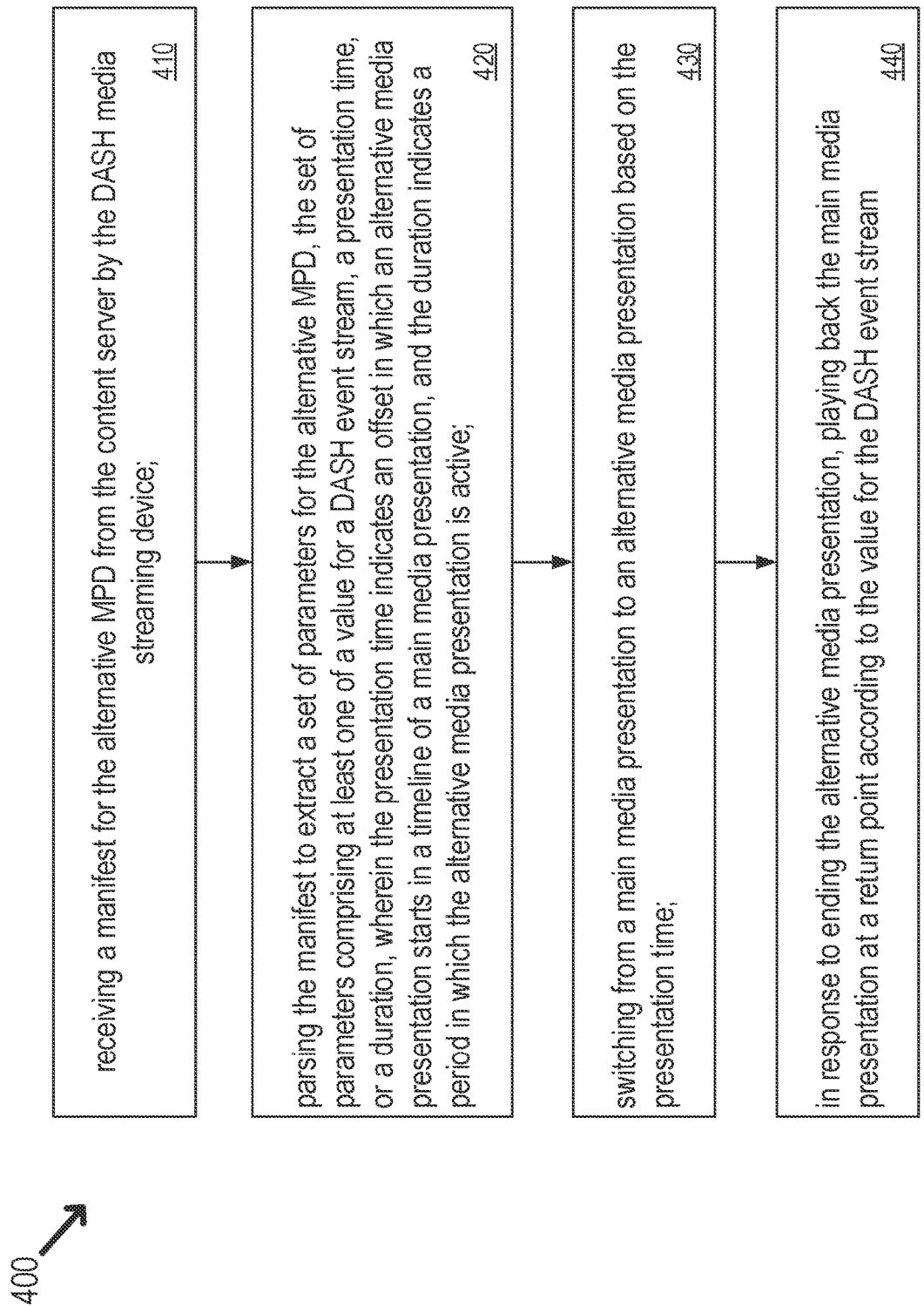
FIG. 4 shows a flow diagram of an exemplary embodiment in the present disclosure.

FIG. 4 shows an example flow diagram of one exemplary method 400 by a media streaming device (e.g., dynamic adaptive streaming over HTTP (DASH) media streaming device) for processing an alternative media presentation description (MPD) with a main MPD from a content server. The method 400 may include a portion or all of the following steps: step 410, receiving a manifest for the alternative MPD from the content server by the DASH media streaming device; step 420, parsing the manifest to extract a set of parameters for the alternative MPD, the set of parameters comprising at least one of a value for an event stream (e.g., a DASH event stream), a presentation time, or a duration, wherein the presentation time indicates an offset in which an alternative media presentation starts in a timeline of a main media presentation, and the duration indicates a period in which the alternative media presentation is active; step 430, switching from a main media presentation to an alternative media presentation based on the presentation time; and/or step 440, in response to ending the alternative media presentation, playing back the main media presentation at a return point according to the value for the DASH event stream.

In various embodiments, the present disclosure provides methods for a media streaming content server to configuring an alternative media presentation description (MPD) with a main MPD. The media streaming content server may send the configured alternative MPD to a media streaming device, and may configure the media streaming device to carry out a portion or all of the method 400, or any other implementations described in the present disclosure.

In some implementations, the presentation time is a different parameter from an actual switching time.

In some implementations, the duration is a different parameter from an actual duration of the alternative media presentation.

In some implementations, the value for the event stream comprises a first value indicating timeshift; and/or the main media presentation is played back to a moment that the main media presentation is switched to the alternative media presentation.

In some implementations, the value for the event stream comprises a second value indicating replace; and/or in response to a first MPD type indicating dynamic, the main media presentation is played back to a live edge of the main media presentation; and/or in response to a second MPD type indicating static, the main media presentation is played back to a moment that the main media presentation is switched to the alternative media presentation plus an actual duration of the alternative media presentation.

In some implementations, the alternative MPD is processed and dispatched according to a dynamic adaptive streaming over hypertext transfer protocol (DASH) event processing.

In some implementations, the step of ending the alternative media presentation comprises at least one of the following: ending playing the alternative media presentation at an end of the duration; or stopping playing the alternative media presentation upon receiving a stop instruction.

In some implementations, in response to an MPD type indicating dynamic: in response to the value indicating replace, a return point for playing back the main media presentation is a live edge of the main media presentation; and/or in response to the value indicating timeshift, the return point for playing back the main media presentation is an earliest segment available at or after an actual switching time.

In some implementations, in response to an MPD type indicating static: in response to the value indicating replace, a return point for playing back the main media presentation is a summation of an actual switching time and an actual duration of the alternative media presentation; and/or in response to the value indicating timeshift, the return point for playing back the main media presentation is the actual switching time.

A parameterization descriptor for media segment requests may be referred to as an MPD data structure. For a non-limiting example, an instantiated data structure of such a type in an MPD, referred to as "UrlQueryInfo", may contain various attributes or descriptors that are used to provide the static as well as dynamic parameterization mechanism for media segments. In some further example implementations, such a static and dynamic parameterization mechanism may be extended to other types of HTTP requests in addition to requests for media segments. An example syntax for an extension data structure type may be specified and may be used to instantiate an MPD containing a corresponding data structure for signaling and prescribing parametrization of the various types (or attributes or values).

Table 1 shows a non-limiting example for corrected and/or improved semantics for alternative MPD signaling.

TABLE 1

Relevant parameters for alternative MPD event in MPD

| Attribute | Value |
|---|---|
| Event Stream@schemeIdUri/ InbandEventStream@schemeIdUri | "urn:mpeg:dash:event:alternative:2022" |
| EventStream@value/ InbandEventStream@value | - "replace" to return to<br>  i. the Media Presentation live edge in the case MPD@type='dynamic', or<br>  ii. (the time in Media Presentation in which the playback is being switched to the alternative Presentation + the alternative Media Presentation duration) in the case MPD@type='static'<br>- "timeshift" to return to the moment in Media Presentation that the playback is switched to the alternative Media Presentation |
| Event@presentationTime | The offset in which the event for Media Presentation Insertion becomes active. The anchor for each offset parameter is defined in 5.10.3.2 accordingly. |
| Event@duration | The duration in which the event for Media Presentation Insertion is active. |
| Event body | URL of the MPD representing the alternative Media Presentation. If this URL does not resolve to a valid MPD, the playback is continued with the main Media Presentation. |

Table 2 shows another non-limiting example for corrected and/or improved semantics for alternative MPD signaling.

TABLE 2

Relevant emsg parameters for alternative MPD event

| Attribute | Value |
|---|---|
| scheme_id_uri | "urn:mpeg:dash:event:alternative:2022" |
| value | - "replace" to return to<br>  i. the Media Presentation live edge in the case MPD@type='dynamic', or<br>  ii. (the time in Media Presentation in which the playback is being switched to the alternative Presentation + the alternative Media Presentation duration) in the case MPD@type='static'<br>- "timeshift" to return to the moment in Media Presentation that the playback is switched to the alternative Media Presentation |
| presentation_time_delta/_prsentation_time | The offset in which the event for Media Presentation Insertion becomes active. The anchor for each offset parameter is defined in 5.10.3.2 accordingly. |
| event_duration | The duration in which the event for Media Presentation Insertion is active. |
| message_data | The MPD URL of the alternative Media Presentation. If this URL does not resolve to a valid MPD, the playback is continued with the main Media Presentation. |

Various embodiments includes a client post-processing model for alternative MPD events. In some implementations, the alternative MPD event is processed and dispatched according to general DASH event processing. In some implementations, the alternative MPD event may be post-processed after being dispatched. Table 3 shows a non-limiting example of parameters, on which the post-processing procedure of the event may rely.

TABLE 3

Event/timed metadata API parameters and datatypes

| API Parameter | MPD event | Inband event | values |
|---|---|---|---|
| scheme_id | Event Stream@schemeIdUri | scheme_id_uri | "urn:mpeg:dash:event:alternative:2022" |
| value | EventStream@value | value | - "replace" to return to<br>  i. the Media Presentation live edge in the case MPD@type='dynamic', or<br>  ii. (the time in Media Presentation in which the playback is being switched to the alternative Presentation + the alternative Media Presentation duration), in the case MPD@type='static'<br>- "timeshift" to return to the moment in Media Presentation that the playback is switched to the alternative Media Presentation |
| presentation_time | Event@presentationTime | presentation_time | The offset in which the event starts in the media presentation timeline |
| duration | Event@duration | duration | The duration in which the event is active |
| Message | Event body | message_data | The MPD URL of the alternative Media Presentation. |

In the present disclosure, a uniform resource name (URN) such as "urn:mpeg:dash:event:alternative:2022" may be defined and used along with optional substrings defined by owner(s) of the URN/URL scheme.

For one non-limiting example for a client's alternative MPD switching event post-processing procedure, a method may include one or more the following steps.

For step 1, a media streaming client (or media streaming device, or client) checks whether an alternative MPD uniform resource locator (URL) in a message is in its previously played list (PPL).

For step 2, when the client determines the alternative MPD URL is in its PPL, the client may not take any further action; and/or when the client determines the alternative MPD URL is not in its PPL, the client may continue one or more of the following steps.

For step 3, the client downloads the alternative MPD.

For step 4, the client determines and performs one of the following cases.

For step 4-1, when the client determines that a current playback time≥a presentation_time, it immediately goes to next step (step 5). In some implementations, the current playback time may indicate a current time of the main media presentation; and/or the presentation_time may indicate a "target" time to switch to the alternative media presentation.

For step 4-2, when the client determines that the current playback time<the presentation_time, it continues playback of the main media presentation until the current playback time=the presentation_time, which is satisfying step 4-1, and then goes to next step.

For step 5, the client sets a switch_time=current playback time. Then, it switches the playback from the main media presentation to the alternative media presentation as long as the main media presentation is not ended. When the main media presentation is ended, it stops and clears its switch_time and PLL buffers.

For step 6, the client stores the main MPD URL and the switch_time.

For step 7, the client adds the message to its PPL.

For step 8, the client, at the end of the alternative media presentation, downloads the main MPD from the main MPD URL. The alternative media presentation may be ended because of at least one of the following: ending playing the alternative media presentation at an end of the duration (i.e., the alternative media presentation completes its configured duration); or stopping playing the alternative media presentation upon receiving a stop instruction (i.e., a user or the content server ends playing of the alternative media presentation before the alternative media presentation completes its configured duration).

For step 9, the client continues playing back the main media presentation based on one of the following steps according to the value and/or a MPD type:

For step 9-1, in response to MPD @type='dynamic': when the value='replace', the playback time position is from the live edge; and/or when the value='timeshift', the playback time position is from the earliest segment available at or after the switch_time. In some implementations, @timeshiftBufferDepth may be set to a value equal to or larger than the maximum alternative media presentation duration so as to assure that the media segments would be available at the switch_time when playback is returned to the main media presentation.

For step 9-2, in response to MPD@type='static': when the value='replace', the playback time position is from (switch_time+duration of alternative media presentation); and/or when the value='timeshift', the playback time position is from the switch_time.

In some implementations, a DASH client clears its URL, switch_time, and PPL values starting at the first parsing of the main MPD and continue maintaining them during the entire playback.

In some implementations, a event presentation_time and a duration indicate the active time interval of a media presentation in which the media presentation is switched to the alternative media presentation. The exact time of switching (the switch_time) depends on how the player reaches the active time interval, e.g., by linear playback to its start time, or by random access to a moment in the middle of it.

Various embodiments may include a method for processing the alternative MPD events wherein the event start time and event duration are maintained as different parameters as switching time and alternative ad duration. The event start time and duration defines the time interval that the switching time may occur while the switching time may change depending on the player's linear playback of the content or random accessing the content in the middle, and the time of switching back is defined by the alternative ad duration, not the event duration. In the processing model, these values are maintained and treated separately, and the signaling of alternative MPD event semantics are defined considering the described processing model.

The techniques described above, can be implemented as computer software using computer-readable instructions and physically stored in one or more computer-readable media. For example, FIG. 5 shows a computer system (500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
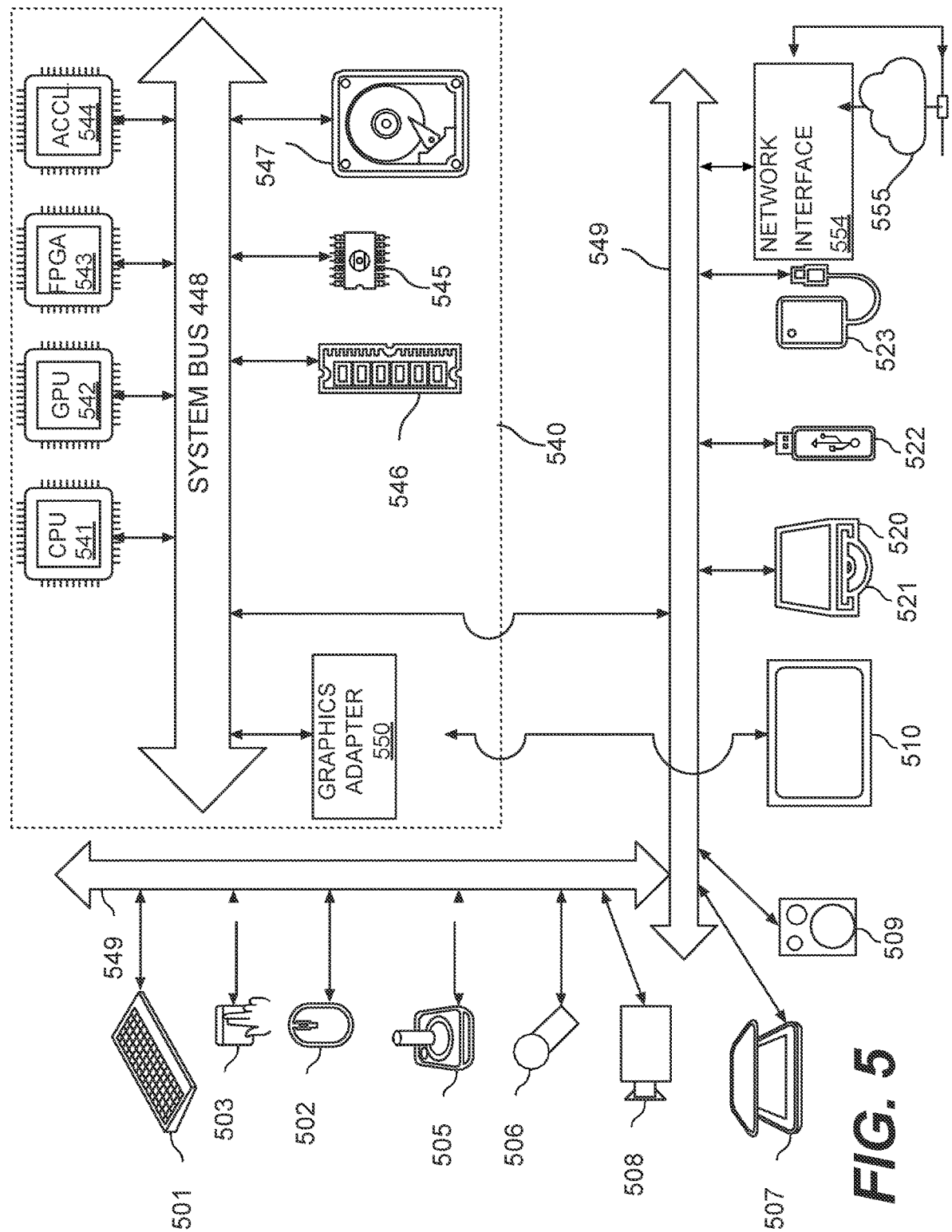
FIG. 5 shows a schematic illustration of a computer system in accordance with example embodiments of the disclosure.

The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include an interface (554) to one or more communication networks (555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (540) of the computer system (500).

The core (540) can include one or more Central Processing Units (CPU) (541), Graphics Processing Units (GPU) (542), specialized programmable processing units in the form of Field Programmable Gate Areas (FPGA) (543), hardware accelerators for certain tasks (544), graphics adapters (550), and so forth. These devices, along with Read-only memory (ROM) (545), Random-access memory (546), internal mass storage such as internal non-user accessible hard drives, SSDs, and the like (547), may be connected through a system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). In an example, the screen (510) can be connected to the graphics adapter (550). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can also be stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (500), and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545).

The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described herein, including defining data structures stored in RAM (546) and modifying such data structures according to the processes defined by the software. In addition to or as an alternative, the computer system can provide functionality as a result of logic hardwired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

In the embodiments and implementation of this disclosure, any steps and/or operations may be combined or arranged in any amount or order, as desired. Two or more of the steps and/or operations may be performed in parallel. Embodiments and implementations in the disclosure may be used separately or combined in any order. Further, each of the methods (or embodiments), a client, and a server may be implemented by processing circuitry (e.g., one or more processors or one or more integrated circuits). In one example, the one or more processors execute a program that is stored in a non-transitory computer-readable medium.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method by a dynamic adaptive streaming over HTTP (DASH) media streaming device for processing an alternative media presentation description (MPD) with a main MPD from a content server, the method comprising:
   receiving a manifest for the alternative MPD from the content server by the DASH media streaming device;
   parsing the manifest to extract a set of parameters for the alternative MPD, the set of parameters comprising at least one of a value for a DASH event stream, a presentation time, or a duration, wherein the presentation time indicates an offset in which an alternative media presentation starts in a timeline of a main media presentation, and the duration indicates a period in which the alternative media presentation is active;
   switching from a main media presentation to an alternative media presentation based on the presentation time; and
   in response to ending the alternative media presentation, playing back the main media presentation at a return point according to the value for the DASH event stream.

2. The method of claim 1, wherein:
   the presentation time is a different parameter from an actual switching time.

3. The method of claim 1, wherein:
   the duration is a different parameter from an actual duration of the alternative media presentation.

4. The method of claim 1, wherein:
   the value for the DASH event stream comprises a first value indicating timeshift; and
   the main media presentation is played back to a moment that the main media presentation is switched to the alternative media presentation.

5. The method of claim 1, wherein:
   the value for the DASH event stream comprises a second value indicating replace;
   in response to a first MPD type indicating dynamic, the main media presentation is played back to a live edge of the main media presentation; and
   in response to a second MPD type indicating static, the main media presentation is played back to a moment that the main media presentation is switched to the alternative media presentation plus an actual duration of the alternative media presentation.

6. The method of claim 1, wherein:
   the alternative MPD is processed and dispatched according to a dynamic adaptive streaming over hypertext transfer protocol (DASH) event processing.

7. The method of claim 1, wherein ending the alternative media presentation comprises at least one of the following:
   ending playing the alternative media presentation at an end of the duration; or
   stopping playing the alternative media presentation upon receiving a stop instruction.

8. The method of claim 1, wherein in response to an MPD type indicating dynamic:
in response to the value indicating replace, a return point for playing back the main media presentation is a live edge of the main media presentation; and
in response to the value indicating timeshift, the return point for playing back the main media presentation is an earliest segment available at or after an actual switching time.

9. The method of claim 1, wherein in response to an MPD type indicating static:
in response to the value indicating replace, a return point for playing back the main media presentation is a summation of an actual switching time and an actual duration of the alternative media presentation; and
in response to the value indicating timeshift, the return point for playing back the main media presentation is the actual switching time.

10. A dynamic adaptive streaming over HTTP (DASH) media streaming device for processing an alternative media presentation description (MPD) with a main MPD from a content server, the DASH media streaming device comprising a memory for storing instructions and a processor for executing the instructions to:
receive a manifest for the alternative MPD from the content server;
parse the manifest to extract a set of parameters for the alternative MPD, the set of parameters comprising at least one of a value for a DASH event stream, a presentation time, or a duration, wherein the presentation time indicates an offset in which an alternative media presentation starts in a timeline of a main media presentation, and the duration indicates a period in which the alternative media presentation is active;
switch from a main media presentation to an alternative media presentation based on the presentation time; and
in response to ending the alternative media presentation, play back the main media presentation at a return point according to the value for the DASH event stream.

11. The DASH media streaming device of claim 10, wherein:
the presentation time is a different parameter from an actual switching time.

12. The DASH media streaming device of claim 10, wherein:
the duration is a different parameter from an actual duration of the alternative media presentation.

13. The DASH media streaming device of claim 10, wherein:
the value for the DASH event stream comprises a first value indicating timeshift; and
the main media presentation is played back to a moment that the main media presentation is switched to the alternative media presentation.

14. The DASH media streaming device of claim 10, wherein:
the value for the DASH event stream comprises a second value indicating replace;
in response to a first MPD type indicating dynamic, the main media presentation is played back to a live edge of the main media presentation; and
in response to a second MPD type indicating static, the main media presentation is played back to a moment that the main media presentation is switched to the alternative media presentation plus an actual duration of the alternative media presentation.

15. The DASH media streaming device of claim 10, wherein:
the alternative MPD is processed and dispatched according to a dynamic adaptive streaming over hypertext transfer protocol (DASH) event processing.

16. The DASH media streaming device of claim 10, wherein in response to an MPD type indicating dynamic:
in response to the value indicating replace, a return point for playing back the main media presentation is a live edge of the main media presentation; and
in response to the value indicating timeshift, the return point for playing back the main media presentation is an earliest segment available at or after an actual switching time.

17. The DASH media streaming device of claim 10, wherein in response to an MPD type indicating static:
in response to the value indicating replace, a return point for playing back the main media presentation is a summation of an actual switching time and an actual duration of the alternative media presentation; and
in response to the value indicating timeshift, the return point for playing back the main media presentation is the actual switching time.

18. A non-transitory computer-readable storage medium for storing instructions, the instructions when executed by a processor of a dynamic adaptive streaming over HTTP (DASH) media streaming device for processing an alternative media presentation description (MPD) with a main MPD from a content server, are configured to cause the DASH media streaming device to:
receive a manifest for the alternative MPD from the content server;
parse the manifest to extract a set of parameters for the alternative MPD, the set of parameters comprising at least one of a value for a DASH event stream, a presentation time, or a duration, wherein the presentation time indicates an offset in which an alternative media presentation starts in a timeline of a main media presentation, and the duration indicates a period in which the alternative media presentation is active;
switch from a main media presentation to an alternative media presentation based on the presentation time; and
in response to ending the alternative media presentation, play back the main media presentation at a return point according to the value for the DASH event stream.

19. The non-transitory computer-readable storage medium of claim 18, wherein:
the presentation time is a different parameter from an actual switching time.

20. The non-transitory computer-readable storage medium of claim 18, wherein:
the duration is a different parameter from an actual duration of the alternative media presentation.

* * * * *